(12) United States Patent
Ohkubo et al.

(10) Patent No.: US 7,555,580 B2
(45) Date of Patent: Jun. 30, 2009

(54) MULTI-FUNCTION PC CARD

(75) Inventors: Masahiko Ohkubo, Tokyo (JP); Noriaki Shinagawa, Kanagawa (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 663 days.

(21) Appl. No.: 10/929,476

(22) Filed: Aug. 31, 2004

(65) Prior Publication Data

US 2006/0047869 A1 Mar. 2, 2006

(51) Int. Cl.
*G06F 13/12* (2006.01)
*G06F 13/00* (2006.01)

(52) U.S. Cl. .............................. 710/62; 710/72; 710/300

(58) Field of Classification Search ............. 710/36–38, 710/62–64, 72–74, 300–306
See application file for complete search history.

(56) References Cited

U.S. PATENT DOCUMENTS

| 5,664,231 | A | * | 9/1997 | Postman et al. ............... 710/73 |
|---|---|---|---|---|
| 5,793,989 | A | * | 8/1998 | Moss et al. .................. 710/105 |
| 5,909,596 | A | * | 6/1999 | Mizuta ........................ 710/63 |
| 6,292,863 | B1 | * | 9/2001 | Terasaki et al. ............. 710/313 |
| 6,981,068 | B1 | * | 12/2005 | Harari et al. .................... 710/2 |
| 7,210,161 | B2 | * | 4/2007 | Ward et al. .................. 725/105 |
| 7,363,413 | B2 | * | 4/2008 | Yamamoto et al. .......... 710/302 |
| 2004/0001471 | A1 | * | 1/2004 | Lee et al. ..................... 370/338 |
| 2006/0282596 | A1 | * | 12/2006 | Morrow et al. .............. 710/302 |

* cited by examiner

*Primary Examiner*—Christopher B Shin
(74) *Attorney, Agent, or Firm*—Rabin & Berdo, P.C.

(57) ABSTRACT

A multi-function PC card includes: a first PC card interface that is capable to be coupled to a host device; a functional block that provides a first function to the host device; a second PC card interface that is capable to be coupled to an additional PC card; and an interface controller that allows one of the functional block and the additional PC card to be accessed by the host device through the first PC card interface.

9 Claims, 16 Drawing Sheets

MULTI-FUNCTION PC CARD

TECHNICAL FIELD OF THE INVENTION

The present invention relates to a LSI mounted in a PC card, which provides a plurality of functions to a host device.

BACKGROUND OF THE INVENTION

A PC card is a card standardized by PCMCIA in the US and JEIDA in Japan. A PC card may have a function of flash-memory, SCSI, LAN, modem and the like. After a PC card standard of "PC Card Standard Release 5.0", a PC card may have a plurality of functions in it.

According to a conventional technology, all necessary functions are built in a single PC card to realize a multi-function. However, it may cost a lot for designing, fabrication and tests of such a multi-function PC card.

OBJECTS OF THE INVENTION

Accordingly, it is an object of the present invention to provide a multi-function PC card that can be designed, fabricated and tested easily as compared to a conventional multi-function PC card.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a multi-function PC card includes: a first PC card interface that is capable to be coupled to a host device; a functional block that provides a first function to the host device; a second PC card interface that is capable to be coupled to an additional PC card; and an interface controller that allows one of the functional block and the additional PC card to be accessed by the host device through the first PC card interface.

In a multi-function PC card according to the present invention, the functional block and the interface controller may be mounted in an LSI. A multifunction PC card may further include a local micon-interface that is cable to be coupled to an external micro-computer. Hereinafter, "micon" means a microcomputer.

According to a second aspect of the present invention, an LSI used in the above described multi-function PC card, the LSI includes: a functional block that provides a first function to the host device; and an interface controller that allows one of the functional block and the additional PC card to be accessed by the host device through the first PC card interface.

In the above described multifunction PC card and LSI according to the first and second aspects of the present invention, the interface controller may include an access block that controls the second PC card interface in accordance with a signal from the external micro-computer.

The access block may include a register having a local access enable bit, which is accessible through the local micon-interface; and an interface-accessing circuit, which accesses the second PC card interface in accordance with a signal from the external micro-computer.

The access enable bit may include a data terminal for the local micon-interface; a write terminal for the local micon-interface; and a flip-flop circuit having a data input terminal, coupled to the data terminal, a clock terminal, coupled to the write terminal and an output terminal coupled to the interface-accessing circuit.

The interface-accessing circuit may include a select circuit that select an signal to be coupled to the second PC interface from between the local micon-interface and the second PC card interface.

DETAILED DISCLOSURE OF THE INVENTION

Figure 1:
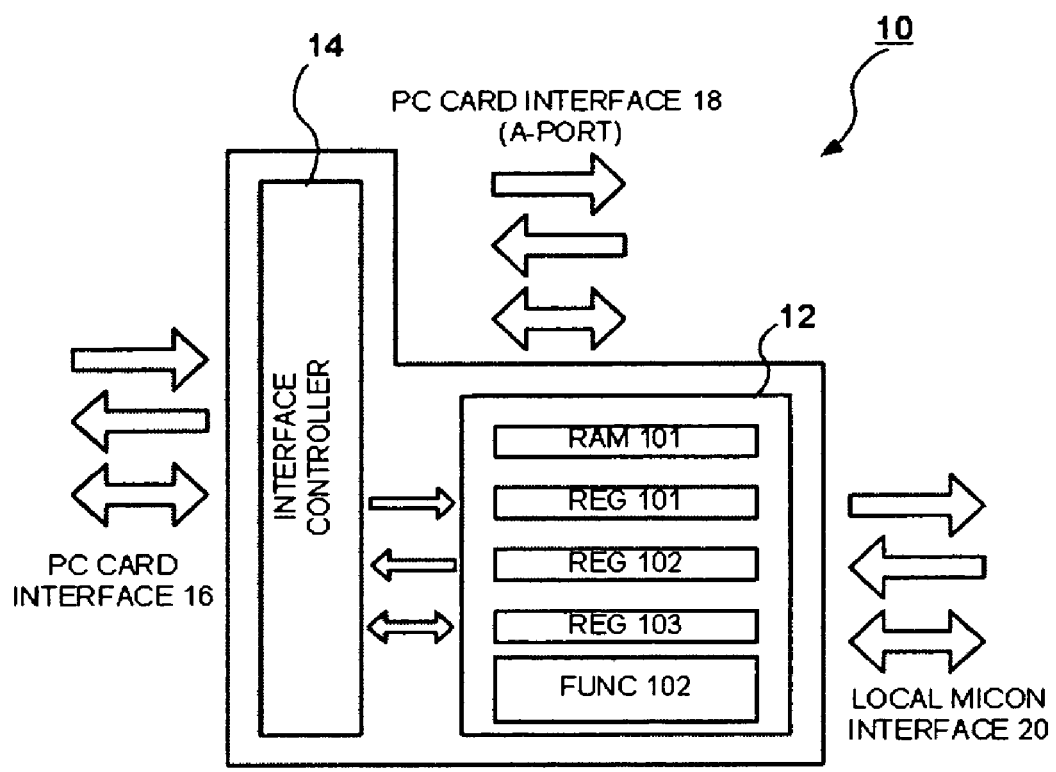
FIG. 1 is a block diagram showing an LSI for a multi-function PC card according to a first preferred embodiment of the present invention.

In the following detailed description of the preferred embodiments, reference is made to the accompanying drawings which form a part hereof, and in which is shown by way of showing specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

FIG. 1 is a block diagram showing a multi-function PC card 10 according to a first preferred embodiment of the present invention. The PC card 10 includes an LSI (12 and 14) and external interfaces 16, 18 and 20. The external interfaces includes a PC card interface 16 to be connected to a host device, such as a personal computer; another PC card interface 18, hereinafter called A-port, to be connected to an additional PC card; and a local micon interface 20 to be connected to a micro-computer for controlling the LSI 10 locally. In circuitry structure, the LSI 10 includes an interface controller 14 and a PC card controller 12.

The PC card controller 12 includes a RAM101, a register REG101, a register REG102, a register REG103 and a function block FUNC102. The functional block FUNC102 may have a UART function, wireless network (LAN) function, or the like. The RAM101 is a RAM stores property information of PC cards according to CIS (Card Information Structure) specified by a PC card standard. The RAM101 is designed to be accessible from the PC card interface and the local micon interface 20.

The registers REG101 and REG102 are configuration registers according to the PC card standard. Fundamental properties of the PC card, including mode-change, I/O port allocation, reset and exchange of status information, can be changed with the registers REG101 and REG102. The register REG103 is used for determining functions of the LSI, and is accessible only from the local micon interface 20.

The PC card interface 16 is standardized by a PC card standard and is to be connected to a host controller, such as a personal computer.

The local micon interface 20 includes the following terminals:

MRSTN: An output terminal for a local micon reset signal, which is a reset signal to a local micro-computer.

MA: An input terminal for a micon address signal.

MD: An Input/Output terminal for a local micon data bus signal.

MCSN: An input terminal for a local-micon-chip-select signal. When this terminal is at a low state, a local access is accepted. When this terminal is at a high state, all of a local access is invalidated.

MRDN: An input terminal for a local micon read signal. When this terminal at a low state, a value of a register specified by an address at the terminal MA is supplied to the terminal MD[7:0].

MWRN: An input terminal for a local micon write signal. When this terminal at a low state, data are written in a register specified by an address at the terminal MA.

MINTN: An output terminal for a local-micon-interruption signal.

The terminals described above are connected to the RAM101, register REG101, register REG102, register REG103 and function block FUNC200, so that those terminals are used for reading and writing operations through the local micon interface 20.

The A-port 18 includes the following terminals:

A_HRESET: (IN) An input terminal for a reset output signal of A-port.

A_HA: (O/T) A terminal to be connected to an address terminal of a PC card controller connected to the A-port.

A_HD: (I/O) A terminal for an A-port two-way data bus signal, and is connected to a data bus terminal of a PC card controller connected to the A-port.

A_HCE2N: (O/T) A terminal for an A-port card-enable two-output signal, and is connected to a card enable 2 terminal of a PC card controller connected to the A-port.

A_HCE1N: (O/T) A terminal for an A-port card-enable one-output signal, and is connected to a card enable 1 terminal of a PC card controller connected to the A-port.

A_HREGN: (O/T) A terminal for an A-port register select output signal, and is connected to a register select terminal of a PC card controller connected to the A-port.

A_HWEN: (O/T) A terminal for an A-port write enable signal, and is connected to a write enable terminal of a PC card controller connected to the A-port.

A_HOEN: (O/T) A terminal for an A-port output enable signal, and is connected to an output enable terminal of a PC card controller connected to the A-port.

A_HIOWRN: (O/T) A terminal for an A-port IO write signal, and is connected to an IO write terminal of a PC card controller connected to the A-port.

A_HIORDN: (O/T) A terminal for an A-port IO read signal, and is connected to an IO read terminal of a PC card controller connected to the A-port.

A_HIREQN: (IN) A terminal for an A-port card service interruption input signal, and is connected to a card service interruption terminal of a PC card controller connected to the A-port.

A_HSTSCHGN: (IN) A terminal for an A-port card status change input signal, and is connected to a card status change interruption terminal of a PC card controller connected to the A-port.

A_HINPACKN: (IN) A terminal for an A-port input acknowledge signal, and is connected to an input acknowledge terminal of a PC card controller connected to the A-port.

A_HWAITN: (IN) A terminal for an A-port wait input signal, and is connected to a wait terminal of a PC card controller connected to the A-port.

The interface controller 14 selectively connects the PC card interface 16 to the A-port 18 or the PC card controller 12.

Figure 2:
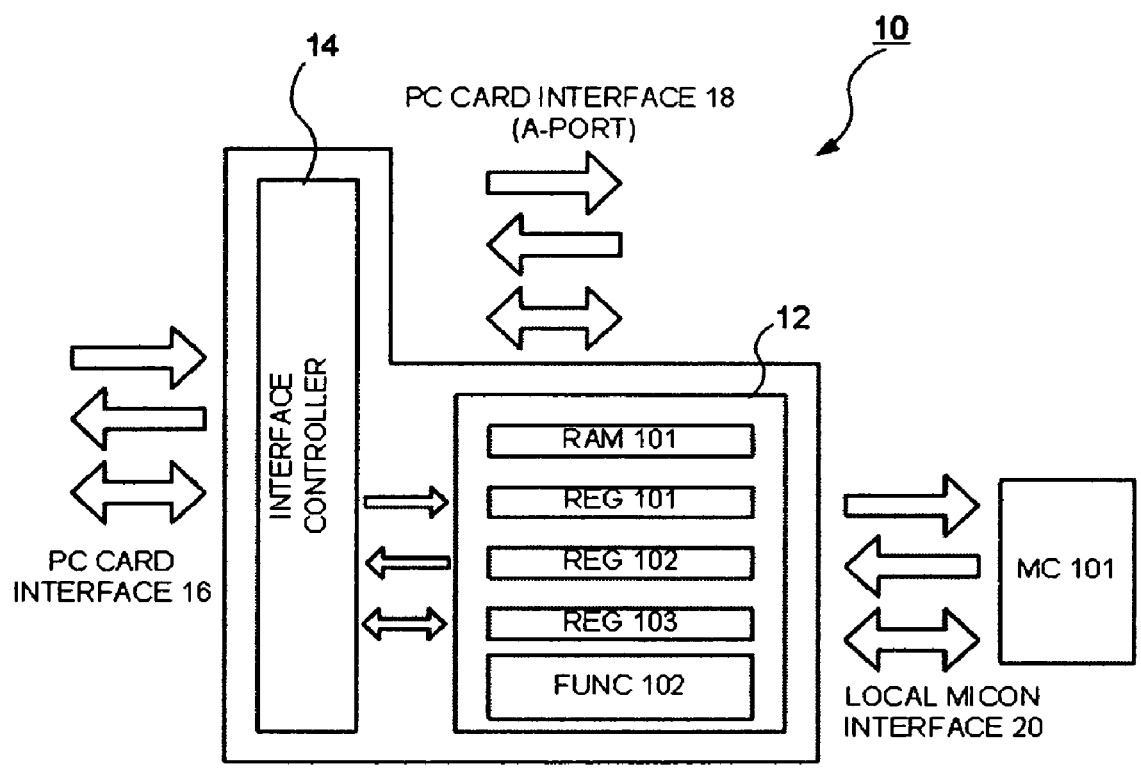
FIG. 2 is a block diagram showing an LSI of the first preferred embodiment, in which a micro-computer is to be connected.

FIG. 2 is a block diagram showing the PC card 10, in which a micro-computer MC101 is connected. The micro-computer MC101

Figure 3:
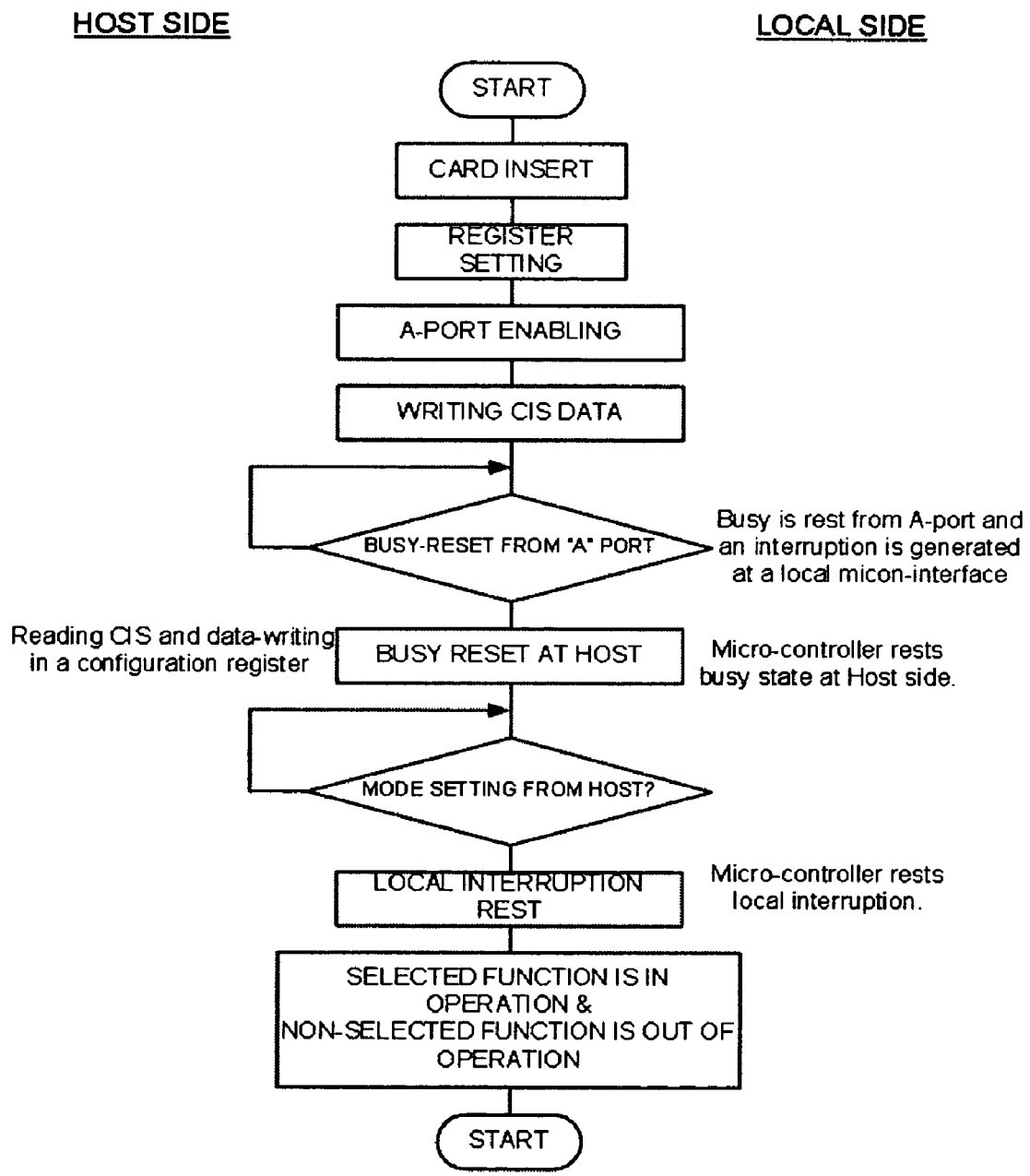
FIG. 3 is a flow-chart showing operation of the LSI shown in FIGS. 1 and 2.

FIG. 3 is a flow-chart showing operation of the PC card 10, shown in FIGS. 1 and 2. When the PC card 10 is inserted into a PC card slot of a host device, a reset operation is carried out. After the A-port 18 is enabled, micro-computer MC101 writes CIS data in the RAM101. Until an interruption from the A-port is generated at the local micon interface 20, the micro-computer MC101 keeps in a waiting state. When an interruption signal is generated, the micro-computer MC101 supplies a ready signal to the PC card interface to reset a busy state. When the host device is reset from a busy state, the host reads the CIS data in the RAM101 to identify the PC card 10.

According to the CIS data, the host device writes data in the configuration register in the PC card controller 12. Based on the written value, operation mode of the LSI (12 and 14) is determined. Then, initializing operation of the PC card 10 is completed.

Figure 4:
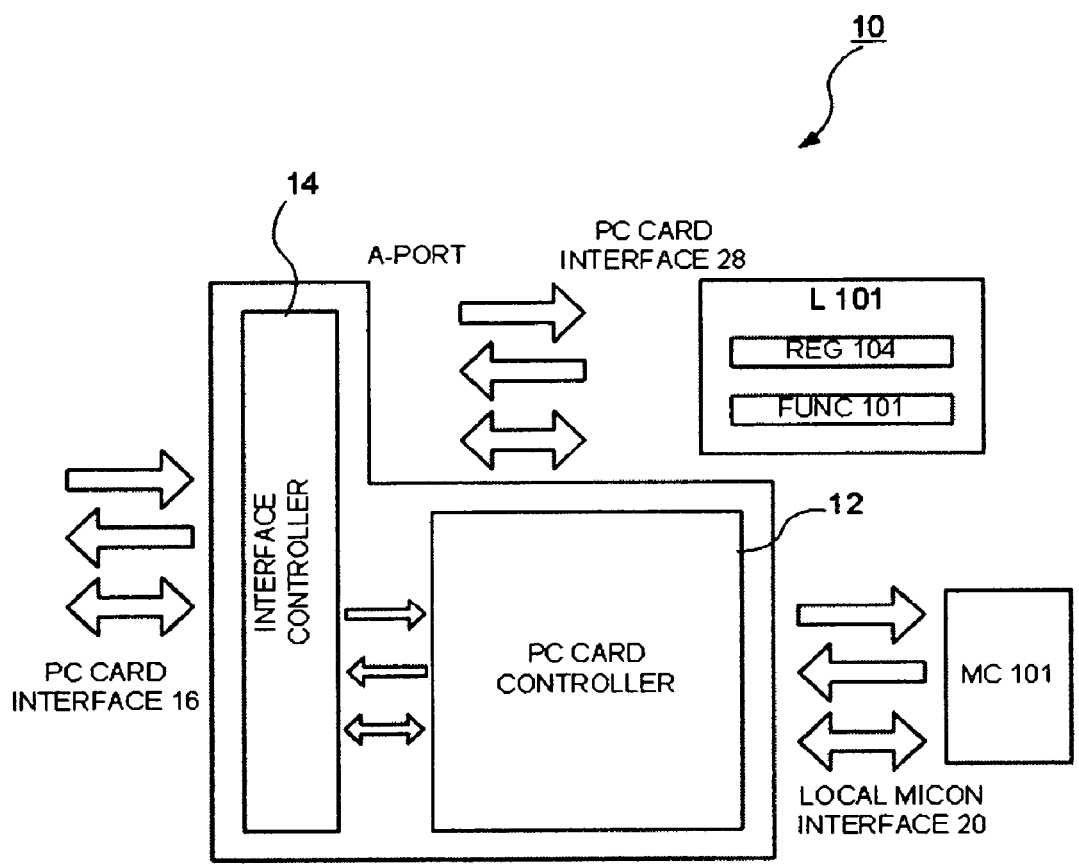
FIG. 4 is a block diagram showing operation of the LSI, shown in FIG. 1.

FIG. 4 is a block diagram showing the PC card 10, in which an additional PC card (LSI) L101 is connected to the A-port (function interface) 18. The PC card LSI L101, for example, has a wireless network (LAN) function therein. The LSI L101 has an interface according to the PC card standard. The LSI L101 includes a register REG104 and a functional block FUNC101. The register REG104 is a configuration register designed according to the PC card standard. The PC card LSI L101 realize a wireless LAN function when the card L101 is connected to a host device.

Figure 5:
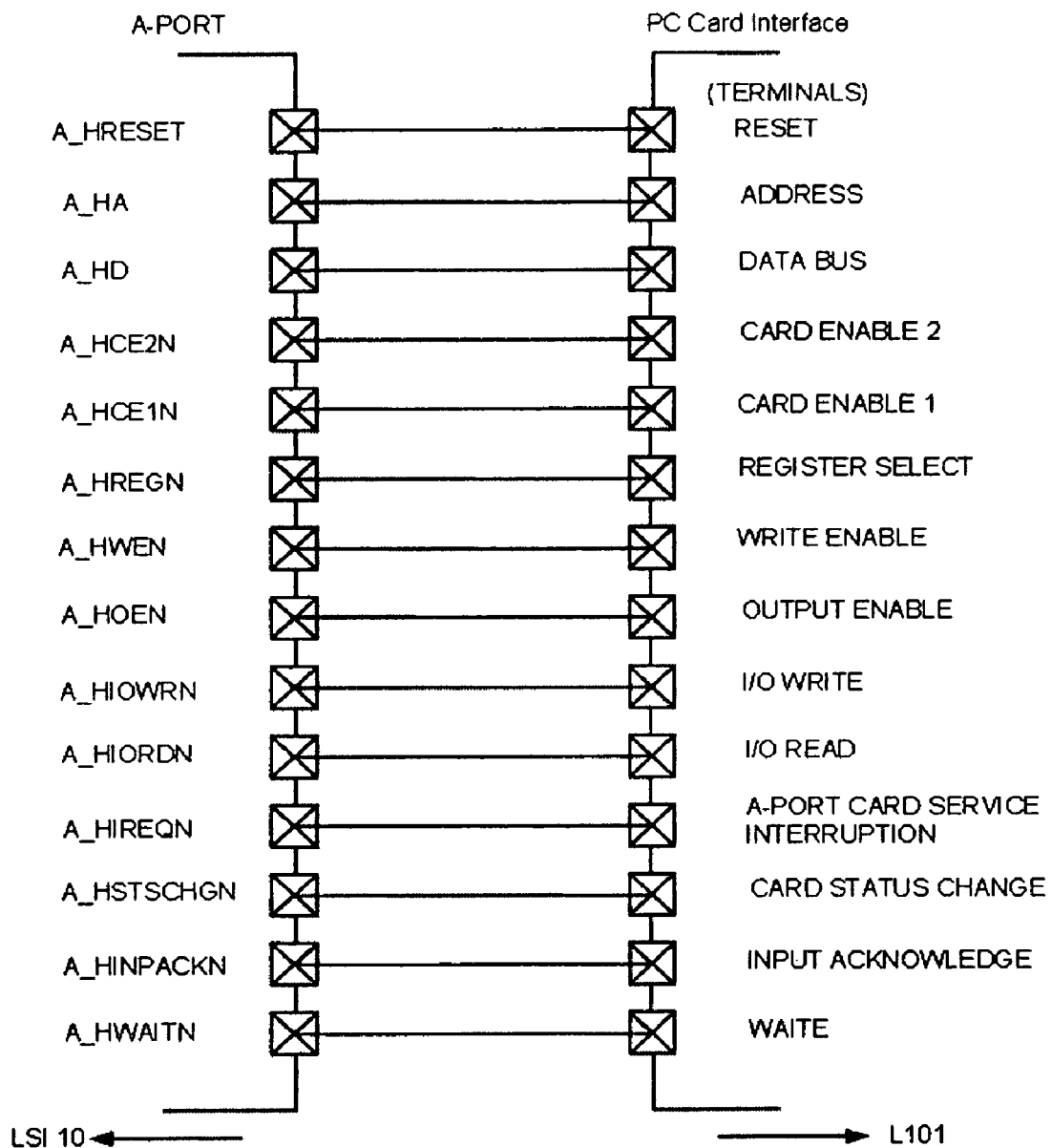
FIG. 5 is a diagram showing connection terminals at A-port, provided for the multi-function PC card, shown in FIGS. 1 and 4.
Figure 6:
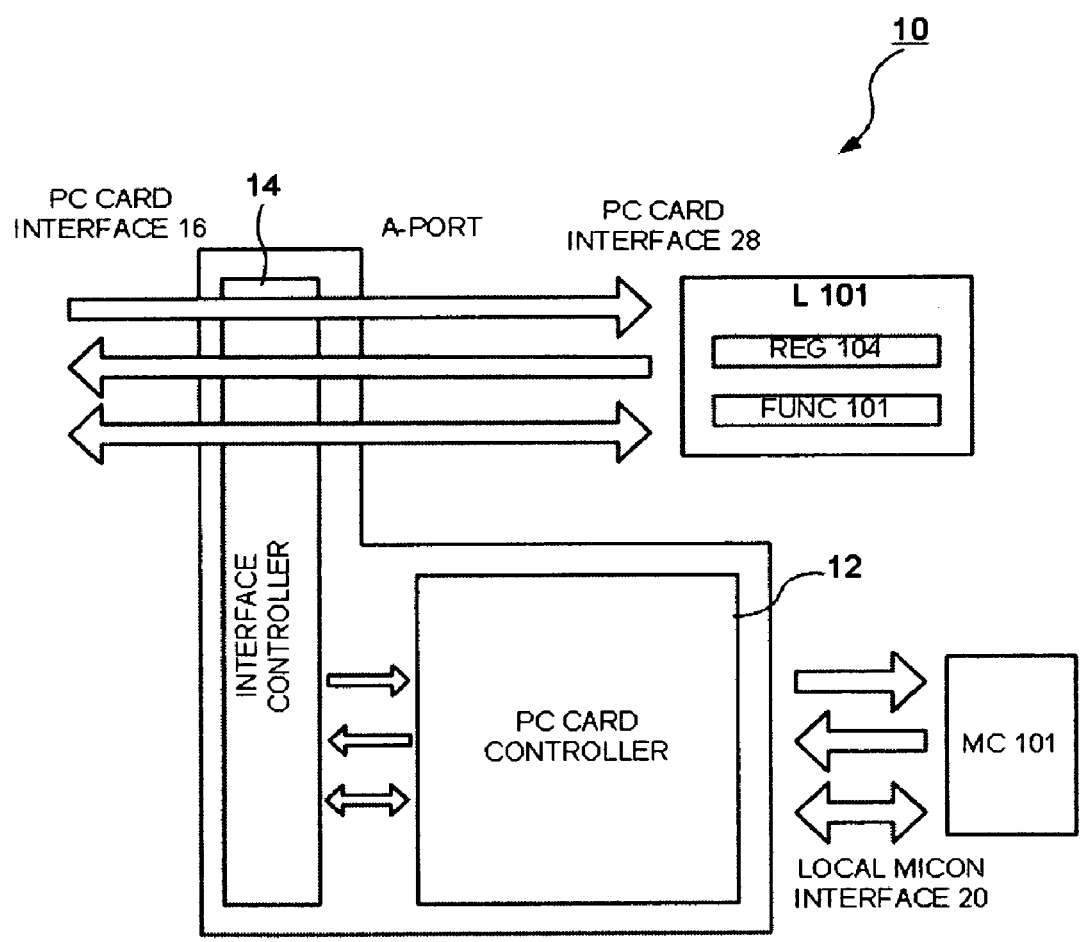
FIG. 6 is a block diagram showing operation of the LSI, shown in FIGS. 1 and 4.

As shown in FIG. 5, a PC card interface 28 of the PC card LSI L101 is connected to the A-port 18 of the PC card LSI 10 of the first preferred embodiment. In initializing operation, the registers REG101, REG102, REG103 and REG104 are set to make the A-port be in use, the PC card interface 28 of the PC card LSI L101 is connected through the A-port (PC card interface) 18 to the PC card interface 16, as shown in FIG. 6. Now, the host device, connected to the PC card interface 16, is allowed to access the PC card LSI101 directly. As a result, the PC card LSI L101, connected to the A-port 18, is allowed to function in the same way as being connected to the PC card interface 16 directly. A multi-function PC card is now formed.

According to the above described first preferred embodiment of the present invention, all necessary functions are not required to be built in a single PC card to realize a multi-function. As a result, a multi-function PC card that can be designed, fabricated and tested easily as compared to a conventional multi-function PC card can be provided.

Figure 7:
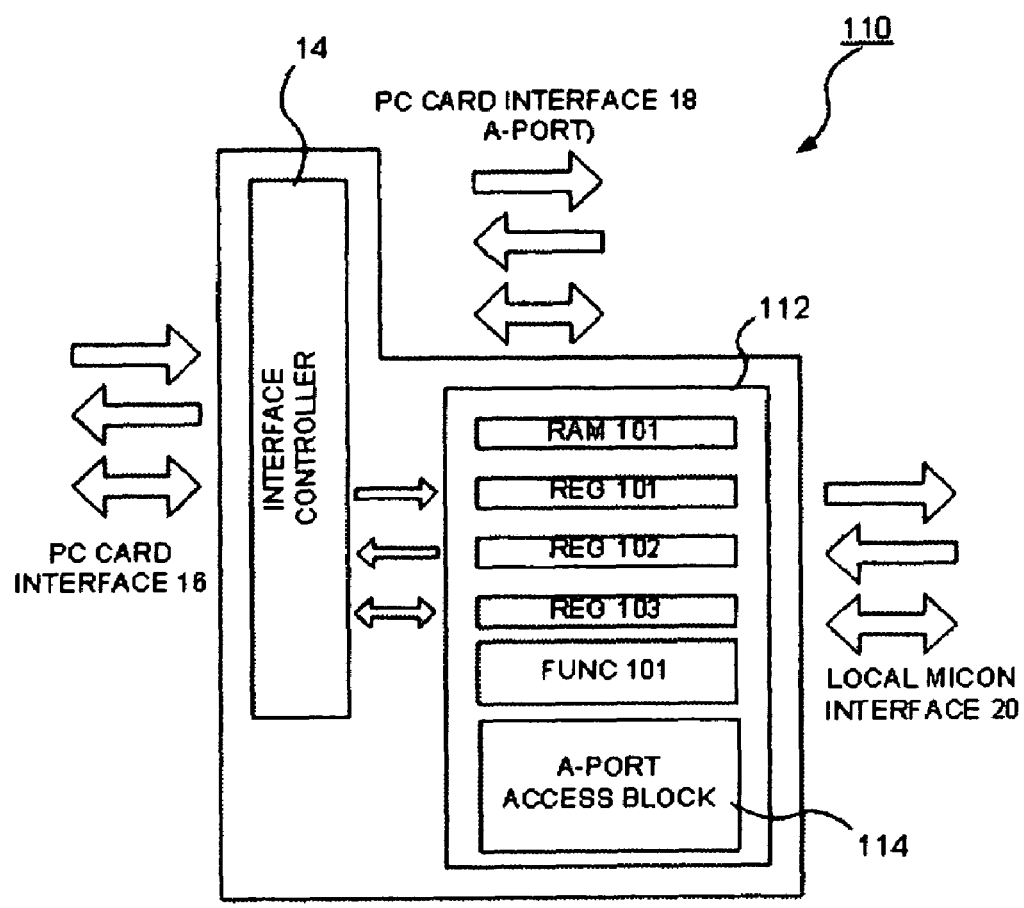
FIG. 7 is a block diagram showing an LSI for a multi-function PC card according to a second preferred embodiment of the present invention.

FIG. 7 is a block diagram showing an LSI for a multi-function PC card 110 according to a second preferred embodiment of the present invention. The same and corresponding components to those in the first preferred embodiment are represented by the same reference numerals and symbols, and the same description is not repeated but applicable.

The PC card 110 includes an LSI (112 and 114) and external interfaces 16, 18 and 20. The external interfaces includes a PC card interface 16 to be connected to a host device, such as a personal computer; another PC card interface 18, hereinafter called A-port, to be connected to an additional PC card; and a local micon interface 20 to be connected to a microcomputer for controlling the LSI 10 locally. In circuitry structure, the LSI includes an interface controller 114 and a PC card controller 112.

The PC card controller 112 includes a RAM101, a register REG101, a register REG 102, a register REG103, a function block FUNC101 and an A-port access block 114. The functional block FUNC102 may have a UART function, wireless network (LAN) function, or the like. The RAM101 is a RAM stores property information of PC cards according to CIS (Card Information Structure) specified by a PC card standard. The RAM101 is designed to be accessible from the PC card interface and the local micon interface 20.

The registers REG101 and REG102 are configuration registers according to the PC card standard. Fundamental properties of the PC card, including mode-change, I/O port allocation, reset and exchange of status information, can be changed with the registers REG101 and REG102. The register REG103 is used for determining functions of the LSI, and is accessible only from the local micon interface 20.

The PC card interface 16 is standardized by a PC card standard and is to be connected to a host controller (host device), such as a personal computer.

Figure 8:
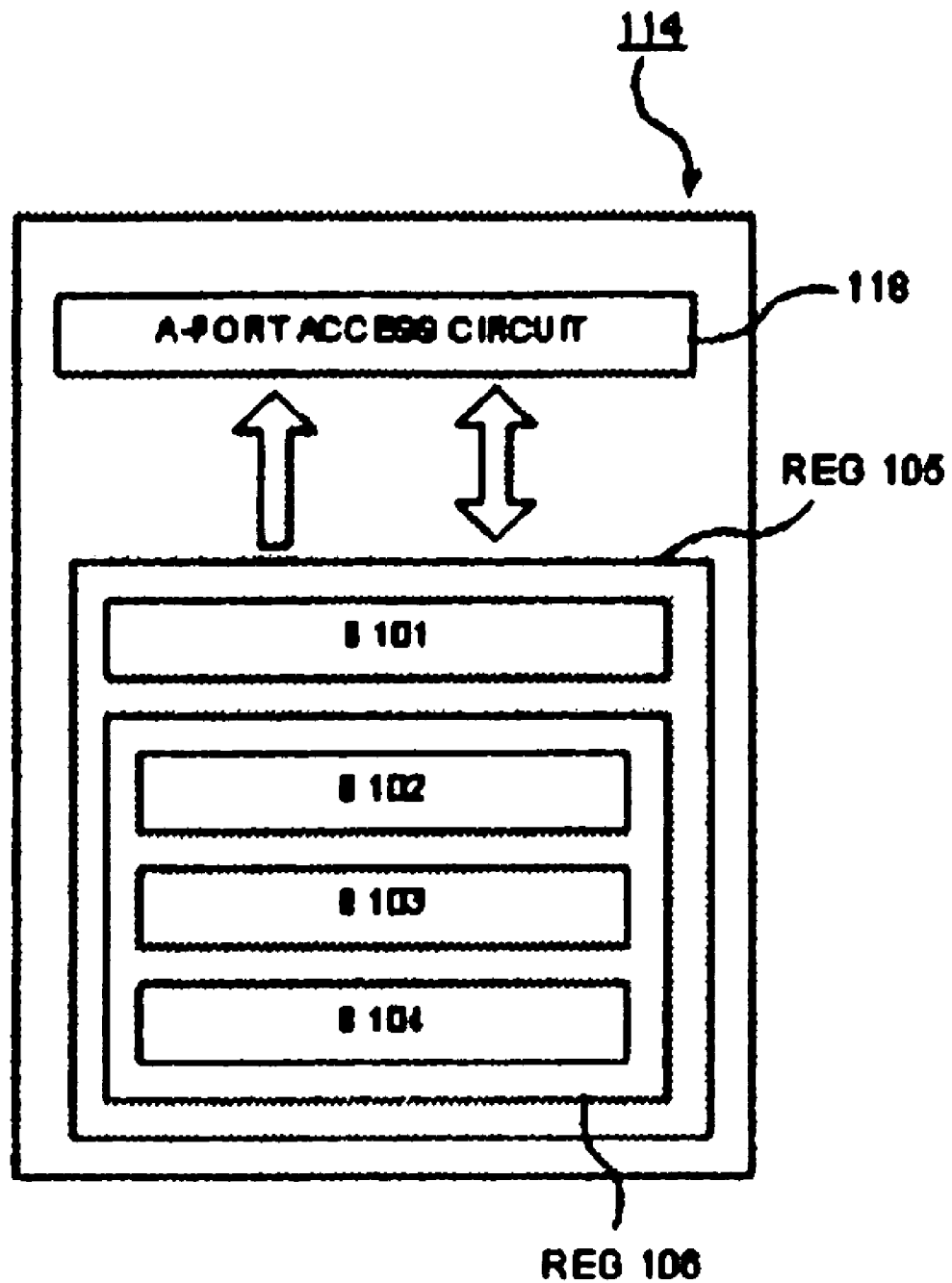
FIG. 8 is a block diagram showing an A-port access block provided in the LSI, shown in FIG. 7.

FIG. 8 is a block diagram showing the A-port access block 114 provided in the LSI, shown in FIG. 7. The A-port access block 114 includes a register REG105 and an A-port access circuit 118. The register REG105 includes a local access enable bit B101 and a register REG106 used for accessing the A-port. The local access enable bit B101 can be accessed from the local-micon-interface 20

Figure 9:
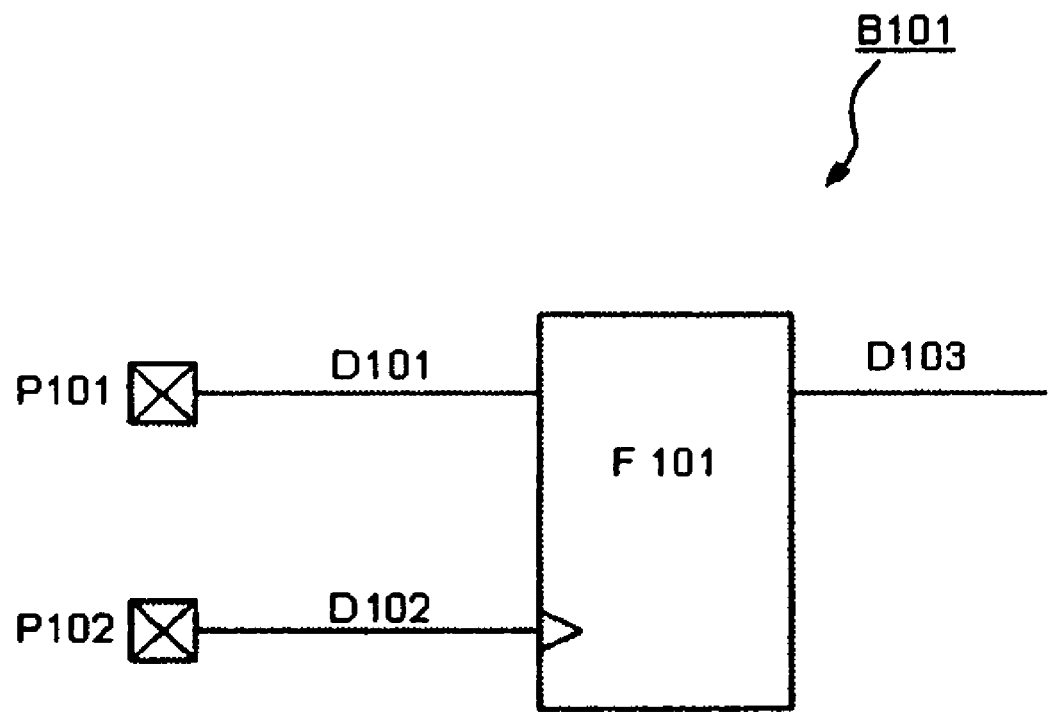
FIG. 9 is a block diagram showing a local-access-enable bit B101 provided in the A-port access block, shown in FIG. 8.
Figure 10:
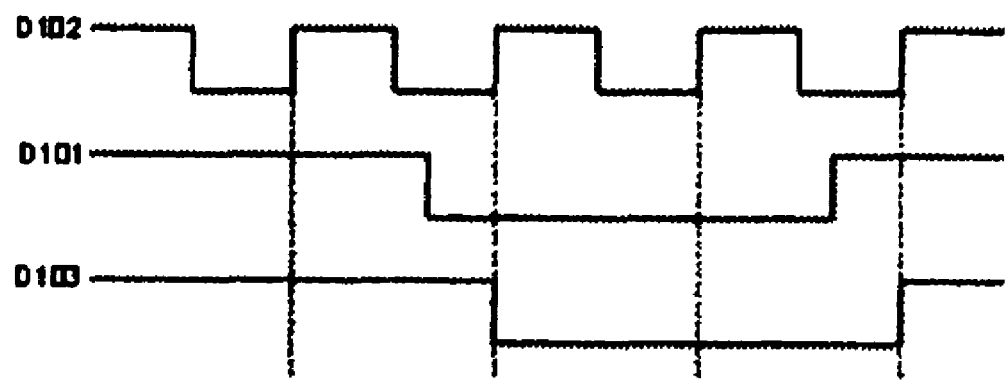
FIG. 10 is a timing chart showing operation of the local-access-enable bit B101, shown in FIG. 9.

FIG. 9 is a block diagram showing the local-access-enable bit B101 provided in the A-port access block 114, shown in FIG. 8. The circuitry of the local access enable bit B101 includes terminals P101 and P102 and a flip-flop circuit F 101. The terminal P101 is a data terminal for the local micon interface 20 and supplies an internal (domestic) signal D101. The terminal P102 is a write terminal for the local micon interface 20 and supplies an internal signal D102. The flip-flop circuit F101 includes a data terminal and a clock terminal, to which the signals D101 and D102 are supplied. In the flip-flop circuit F101, the signal D101 is entered at a positive edge of the signal D102 and an internal signal D103 is outputted, as shown in FIG. 10. The value of the signal D103 is maintained until the next positive edge of the signal D102 is supplied. The signal D103 is supplied to the A-port access circuit 118.

The register REG106 includes bits B102, B103 and B104. The bit B102 is used for controlling an output terminal of the A-port 18.

Figure 11:
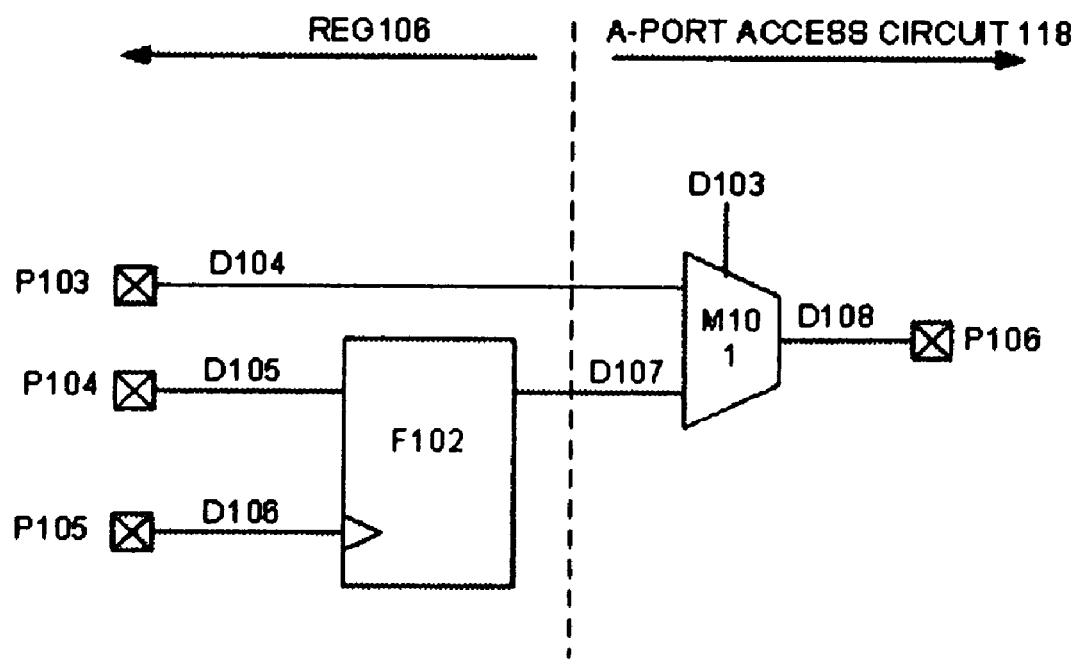
FIG. 11 is a block diagram showing circuitry in a local access mode of the A-port access block, shown in FIG. 8.

FIG. 11 is a block diagram showing the circuitry in a local access mode of the A-port access block 114, shown in FIG. 8. The circuitry includes external terminals P103, P104, P105 and P106; a flip-flop circuit F102 and a select circuit M101. Symbols D103, D105, D106, D107 and D108 represent internal signals. The external terminal P103 is a PC card interface terminal used for controlling an A-port terminal to supply the internal signal D104. The external terminal P104 is a local-micon-interface data terminal supplying the internal signal D105. The external terminal P105 is a local-micon-interface write terminal supplying the internal signal D106. The external terminal P106 is an A-port terminal supplying the internal signal D108.

The flip-flop circuit F102 includes a data input terminal and a clock terminal, to which the internal signals D105 and D106 are supplied, respectively. The flip-flop circuit F102 also includes an output terminal connected to an input terminal of the select circuit M101. In the flip-flop circuit F102, the signal D105 is entered at a positive edge (rising edge or turn-to-high point) of the signal D106 and the internal signal D107 is outputted. The value of the signal D107 is maintained until the next positive edge of the signal D106 is supplied thereto.

The select circuit M101 includes an input terminal connected to the external terminal P103. Another input terminal of the select circuit M101 is supplied with the internal signal D103. An output terminal of the select circuit M101 is connected to the external terminal P106. When the internal signal D103 is at a lower state, the select circuit M101 outputs the internal signal D104 as an output signal D108 to the external terminal P106. On the other hand, when the internal signal D103 is at a higher state, the select circuit M101 outputs the internal signal D107 as an output signal D108 to the external terminal P106.

In operation of the circuitry shown in FIG. 11, when the internal signal D103 is in a low state, the select circuit M101 transfers the status of the internal signal D104 to the signal D108. Accordingly, the external terminal P106 shows the status of the terminal P103. An input data of the flip-flop circuit F102 is supplied from the terminal P104. The internal signal D105 from the terminal P104 is outputted from the flip-flop circuit F102 when the status of the terminal P105 is changed. The output D107 of the flip-flop circuit F102 is supplied to the select circuit M101. When the internal signal D103 is in a high state, the select circuit M101 transfers the status of the internal signal D107 to the terminal P106. The internal signal D103 is determined from the local micon interface 20, as shown in FIG. 9. That is, according to the value of the signal D103, the select circuit M101 selectively allows one of the PC card interface 16 and the local micon interface 20 to access to the A-port 18.

Figure 12:
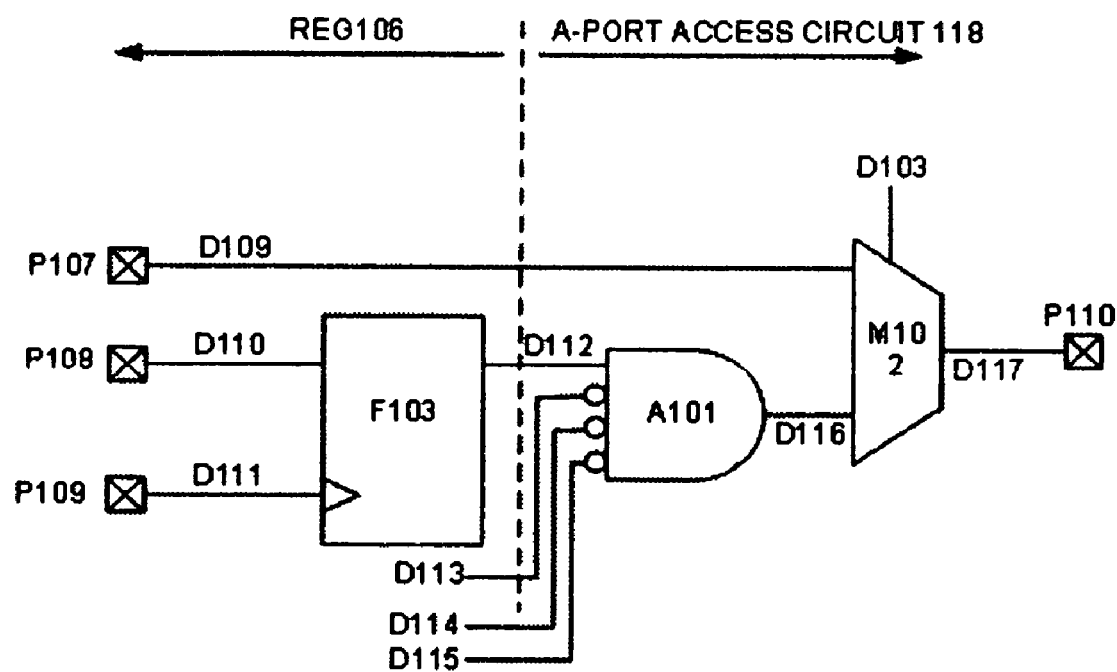
FIG. 12 is a block diagram showing circuitry for data output in a local access mode of the A-port access block, shown in FIG. 8.

FIG. 12 is a block diagram showing circuitry for data output in a local access mode of the A-port access block 118, shown in FIG. 8. In other words, FIG. 12 shows a control circuit of a data output terminal from the A-port 18. The circuitry includes external terminals P107, P108, P109 and P110; a flip-flop circuit F103; an AND circuit A101; and a select circuit M103. Symbols D109, D110, D111, D112 and D116 represent internal signals.

The external terminal P107 is a data terminal of the PC card interface and is supplying the internal signal D109. The external terminal P108 is a data terminal for the local-micon-interface 20 and is supplying the internal signal D110. The external terminal P109 is a local-micon-interface write terminal and is supplying the internal signal D111. The external terminal P110 is an A-port data terminal and is supplying the internal signal D112.

The flip-flop circuit F103 includes a data input terminal and a clock terminal, to which the internal signals D110 and D111 are supplied, respectively. The flip-flop circuit F103 also includes an output terminal connected to an input terminal of the AND circuit A101. In the flip-flop circuit F103, the signal D110 is entered at a positive edge (rising edge or turn-to-high point) of the signal D111 and the internal signal D112 is outputted. The value of the signal D110 is maintained until the next positive edge of the signal D111 is supplied thereto.

The AND circuit A101 has four input terminals to which signals D112, D113, D114 and D115 are supplied. When the signal D112 is high and the signals D113, D114 and D115 are low, the AND circuit A101 supplies an output signal D116 of high state. In the other cases, the AND circuit A101 supplies an output signal D116 of low state.

The select circuit M102 includes an input terminal connected to the external terminal P107. Another input terminal of the select circuit M102 is connected to an output terminal of the AND circuit A101 to receive the internal signal D116. An output terminal of the select circuit M102 is connected to the external terminal P110.

In operation of the circuitry shown in FIG. 12, when the internal signal D103 is in a low state, the select circuit M102 transfers the status of the internal signal D109 to the signal D117. Accordingly, the external terminal P110 shows the status of the terminal P107. An input data of the flip-flop circuit F103 is supplied from the terminal P108. The internal signal D110 from the terminal P108 is outputted from the flip-flop circuit F103 when the status of the terminal P109 is changed. The output D116 of the flip-flop circuit F103 is supplied to the select circuit M121. While all of the signals D113, D114 and D115 are at a low state, the AND circuit A101 transfers the status of the signal D112 to the signal D116. When the signal D103 is at a low state, the signal D116 does not pass through the M102. When the internal signal D103 is in a high state, the select circuit M102 transfers the status of the internal signal D112 to the terminal P110.

The internal signal D103 is determined from the local micon interface 20, as shown in FIG. 9. That is, according to the value of the signal D103, the select circuit M102 selectively allows one of the PC card interface 16 and the local micon interface 20 to access to the A-port 18.

Figure 13:
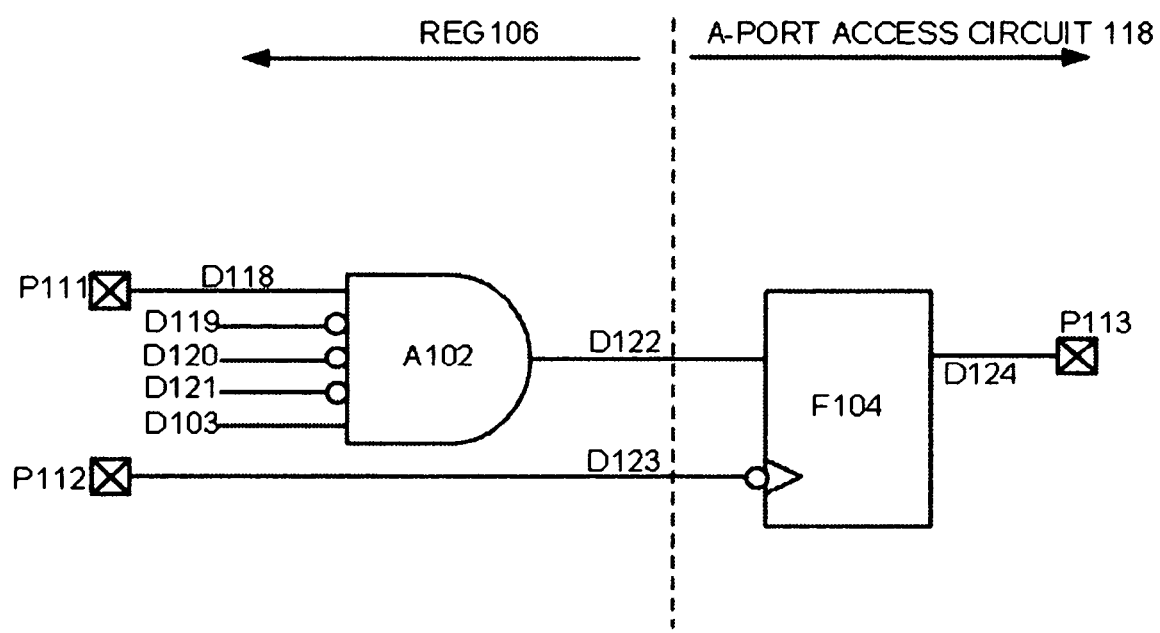
FIG. 13 is a block diagram showing circuitry for data input in a local access mode of the A-port access block, shown in FIG. 8.

FIG. 13 is a block diagram showing circuitry for data input in a local access mode of the A-port access block, shown in FIG. 8. The circuitry includes terminals P111, P112 and P113; an AND circuit A102; and a flip-flop circuit F 104. The terminal P111 is an A-port data terminal supplying an internal (domestic) signal D118. The terminal P112 is a read terminal for the local micon interface 20, supplying an internal signal D123. The terminal P113 is a data terminal for the local micon interface 20, supplying an internal signal D124.

The flip-flop circuit F104 includes a data input terminal and a reverse (negative) clock terminal, to which the internal signals D122 and D123 are supplied, respectively. The flip-flop circuit F104 also includes an output terminal connected to the terminal P113. In the flip-flop circuit F104, the signal D122 is entered at a negative edge (falling edge or turn-to-low point) of the signal D123 and the internal signal D124 is outputted. The value of the signal D122 is maintained until the next negative edge of the signal D123 is supplied thereto.

The AND circuit A102 has five input terminals to which signals D118, D119, D120, D121 and D103 are supplied. When the signals D118 and D103 are high and the signals D119, D120 and D121 are low, the AND circuit A102 supplies an output signal D122 of high state (high level). In the other cases, the AND circuit A102 supplies an output signal D122 of low state. The signals D119, D120 and D121 are respectively corresponding to a card enable signal, a register select signal and a read enable signal to the A-port 18, provided when the signal D103 is in a high state.

In operation of the circuitry shown in FIG. 13, when the internal signal D103 is high and all of the signals D119, D120 and D121 are low, the status of the signal D118 supplied from the terminal P111 is transferred to the signal D122. The signal D122 is supplied to the flip-flop circuit F104. The flip-flop circuit F104 outputs the inputted data (D122) as the signal D124 in response to a status change of the clock signal D123. The signal D124 is supplied to the terminal P113.

Figure 14:
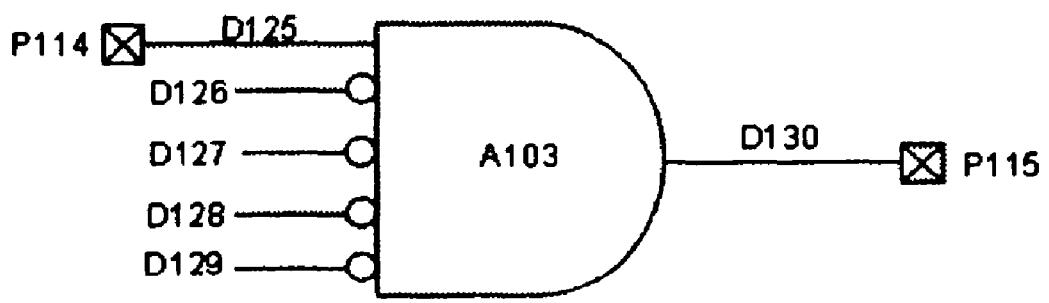
FIG. 14 is a block diagram showing another circuitry for data input in a local access mode of the A-port access block, shown in FIG. 8.

FIG. 14 is a block diagram showing another circuitry for data input in a local access mode of the A-port access block, shown in FIG. 8. In other words, the circuitry shown in FIG. 14 is another example of a data input terminal from the A-port. The circuitry shown in FIG. 14 includes terminals P114 and P115 and an AND circuit A103. The terminal P114 is an A-port data terminal supplying an internal (domestic) signal D125. The terminal P115 is a data terminal for the local micon interface 20, supplying an internal signal D130.

The AND circuit A103 includes five input terminal, one of which is connected to the terminal P114, and an output terminal connected to the terminal P115. The other input terminals are supplied with signals D126, D127, D128 and D129. When an input signal D125 is high and all of the other input signals D126, D127, D128 and D129 are low, the AND circuit A103 supplies an output signal D130 of high state (high level). In the other cases, the AND circuit A103 supplies an output signal D130 of low state. The signals D126, D127 and D128 are respectively corresponding to a card enable signal, a register select signal and a read enable signal to the A-port 18, provided when the signal D103 is in a high state.

According to the present invention, the local access enable bit B101 (FIG. 8) is set to "ENABLE" in a multi-function mode, so that the A-port 18 can be accessed only from the local micon interface 20 but not from the host device.

Figure 15:
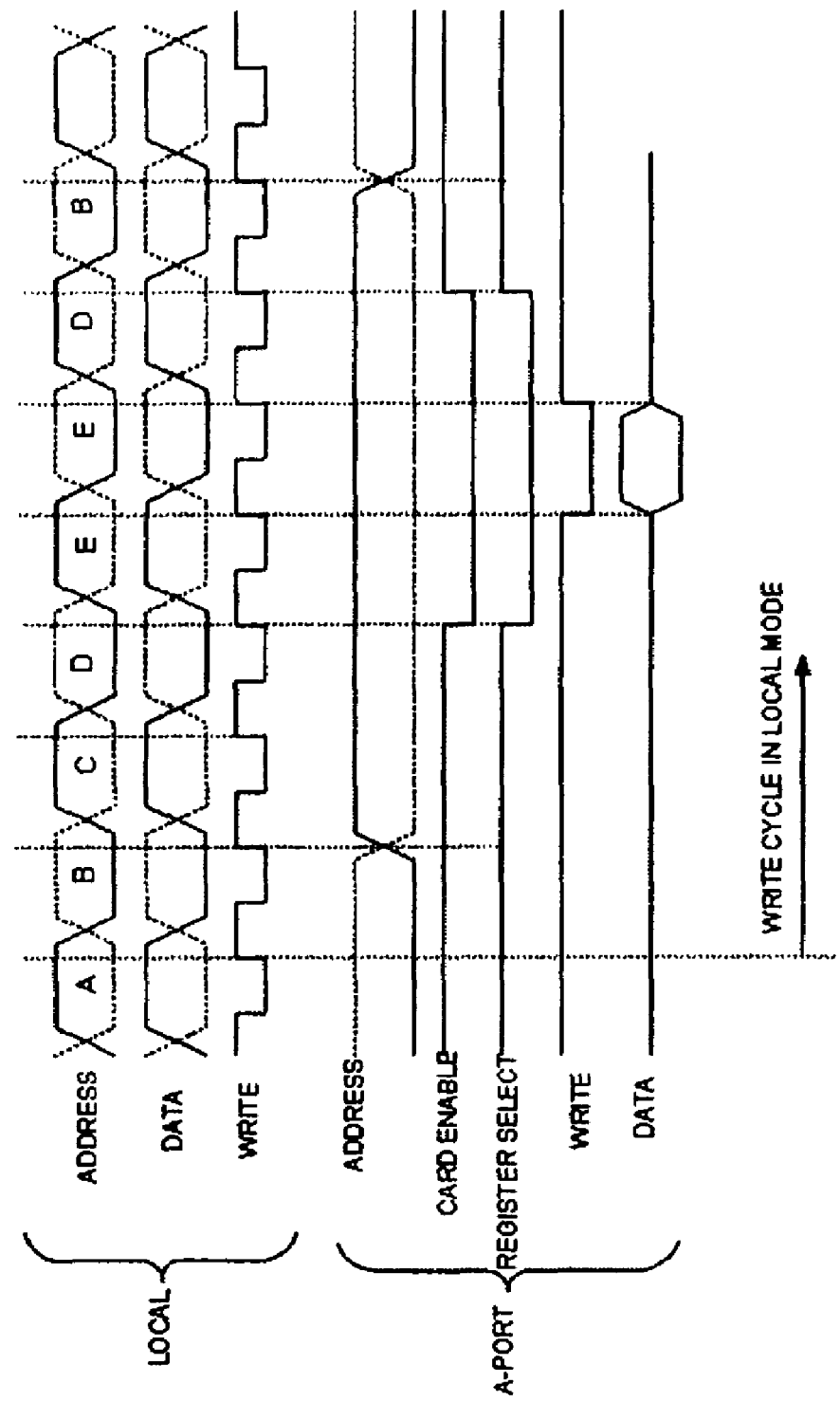
FIG. 15 is a timing chart showing operation in a local-mode-write cycle of the LSI shown in FIG. 7.

FIG. 15 is a timing chart showing operation in a local-mode-write cycle of the LSI shown in FIG. 7. In the chart, each symbols represents the following information:

A: B101 Local mode access enable bit address
B: B102 Address for address bit setting
C: B103 Address
D: B102 Address for card-enable and register-select-setting
E: B102 Address for output-enable-setting An address value is written from the local micon interface 20 to an A-port address setting register. The written data is supplied to an address terminal of the A-port 18. Next, write data for A-port function are set to an A-port data bit. A card-enable terminal control bit and a register select terminal are set, so that a card enable terminal and a register select terminals are set to low.

Subsequently, an A-port output-enable-terminal control bit or A-port IO output-enable-terminal control bit is set so that an output enable-terminal or IO output enable terminal is set to low. At this time, data set at an A-pot data-setting bit are outputted to a data bus terminal of the A-port 18.

Next, the card-enable terminal control bit and the register select terminal are set, so that the card enable terminal and the register select terminals are set to high. Now, desired data are written in desired address of the A-port function from the local micon interface 20.

Figure 16:
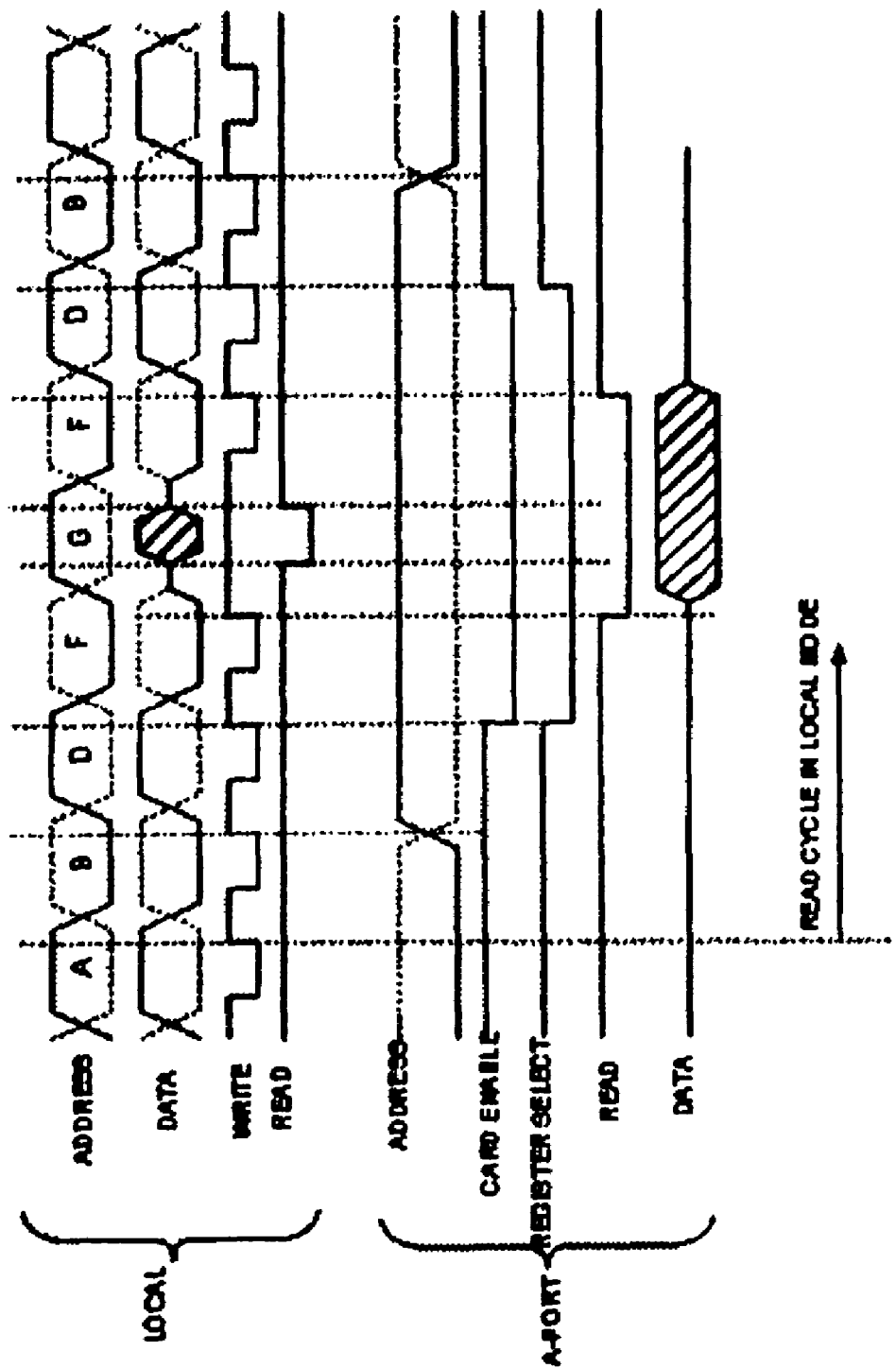
FIG. 16 is a timing chart showing operation in a local-mode-read cycle of the LSI shown in FIG. 7.

FIG. 16 is a timing chart showing operation in a local-mode-read cycle of the LSI shown in FIG. 7. In the chart, each symbols represents the following information:

A: B101 Local mode access enable bit address
B: B102 Address for address bit setting
C: B103 Address
D: B102 Address for card-enable and register-select-setting
E: B102 Address for output-enable-setting An address value is written from the local micon interface 20 to an A-port address setting register. The written data is supplied to an address terminal of the A-port 18. Next, write data for A-port function are set to an A-port data bit. A card-enable terminal control bit and a register select terminal are set, so that a card enable terminal and a register select terminals are set to low.

Subsequently, an A-port input-enable-terminal control bit or A-port IO input-enable-terminal control bit is set so that an input enable terminal or IO input enable terminal is set to low. Data stored in a register for A-port read data are read by or from the local micon interface 20. Now, data stored at desired address of the A-port function can be read.

After that, the card enable terminal control bit and register select terminal are set to so that the card enable terminal and register select terminal are tuned to high. The A-port returns to a normal mode, and the reading cycle is ended.

According to the second preferred embodiment, the A-port access block is provided, so that the A-port (function) can be accessed from the local side (function). According to the first preferred embodiment, the A-port is controlled only from the host device when a power of the A-port function is turned on. On the other hand, the A-port function can be controlled without any load to software in the host device, and the configuration setting in the LSI can be recreated from the local side. Further, the power switch of the A-port can be turned on and off without any operation to the host side.

As described above, according to the present invention, even if the PC card standard is changed or renewed and additional terminal is provided to a PC card interface or the standard the PC card interface is changed, the PC card LSI (10, 110) can be controlled from the local side to satisfy the new standard by adding a bit(s) for controlling the added terminal(s).

What is claimed is:

1. A multifunction PC card, comprising:
a first PC card interface that is capable to be coupled to a host device;
a functional block that provides a first function to the host device;
a second PC card interface that is capable to be coupled to an LSI providing a second function to the host device;
an interface controller that allows either the functional block or the LSI to be accessed by the host device through the first PC card interface, and
a third interface that is capable to be coupled to an external micro-computer,
wherein the interface controller comprises an access block that controls the second PC card interface in accordance with a signal from the external micro-computer, and
wherein the access block comprises a register having a local access enable portion, which is accessible through the third interface; and an interface-accessing circuit, which accesses the second PC card interface in accordance with a signal from the external micro-computer.

2. A multi-function PC card according to claim 1, wherein the LSI is a first LSI, and wherein the functional block and the interface controller are included in a second LSI.

3. A multifunction PC card, according to claim 1, wherein, the local access enable portion comprises a data terminal for the third interface; a write terminal for the third interface; and a flip-flop circuit having a data input terminal, coupled to the data terminal, a clock terminal, coupled to the write terminal and an output terminal coupled to the interface-accessing circuit.

4. A multifunction PC card, according to claim 1, wherein, the interface-accessing circuit comprises a select circuit that selects a signal to be coupled to the second PC card interface from between the third interface and the second PC card interface.

5. A multi-function card according to claim 1, wherein the first function is selected from the group consisting of a UART function and a wireless communication function.

6. A multi-function PC card comprising:
a first PC card interface that is capable of being coupled to a host device;
a second PC card interface that is capable of being coupled to a first LSI providing a function to the host device,
a second LSI which includes:
a functional block that provides another function to the host device, and
an interface controller that allows either the functional block or the first LSI to be accessed by the host device through the first PC card interface, and
a third interface that is capable of coupling the second LSI to an external micro-computer,
wherein the interface controller comprises an access block that controls the second PC card interface in accordance with a signal from the external micro-computer, and
wherein the access block comprises a register having a local access enable portion, which is accessible through the third interface; and an interface-accessing circuit, which accesses the second PC card interface in accordance with a signal from the external micro-computer.

7. A multi-function PC card according to claim 6, wherein, the access enable portion comprises a data terminal for the third interface; a write terminal for the third interface; and a flip-flop circuit having a data input terminal, coupled to the data terminal, a clock terminal, coupled to the write terminal and an output terminal coupled to the interface-accessing circuit.

8. A multi-function PC card according to claim 6, wherein, the interface-accessing circuit comprises a select circuit that selects a signal to be coupled to the second PC interface from between the third interface and the second PC card interface.

9. A multi-function card according to claim 6, wherein the function provided by the functional block included in the second LSI is selected from the group consisting of a UART function and a wireless communication function.

* * * * *